(12) United States Patent
Inage et al.

(10) Patent No.: US 7,611,676 B2
(45) Date of Patent: *Nov. 3, 2009

(54) METHOD FOR PRODUCING GAS TURBINE FUEL, AND METHOD AND SYSTEM FOR GENERATING ELECTRIC POWER BY GAS TURBINE

(75) Inventors: Shinichi Inage, Hitachi (JP); Hirokazu Takahashi, Hitachinaka (JP); Koji Nishida, Hitachiohta (JP); Akinori Hayashi, Hitachinaka (JP); Nobuyuki Hokari, Hitachinaka (JP); Osami Yokota, Hitachinaka (JP); Shinsuke Kokubo, Hitachinaka (JP); Tetsuo Sasada, Hitachi (JP); Tsunemasa Nishijima, Hitachi (JP); Toshifumi Sasao, Mito (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 11/526,118

(22) Filed: Sep. 25, 2006

(65) Prior Publication Data

US 2007/0215522 A1 Sep. 20, 2007

(30) Foreign Application Priority Data

Sep. 26, 2005 (JP) ............................. 2005-277711

(51) Int. Cl.
- *B01J 8/18* (2006.01)
- *C10G 1/04* (2006.01)
- *C10G 21/00* (2006.01)
- *C10C 3/00* (2006.01)
- *C10G 1/00* (2006.01)
- *B01D 11/00* (2006.01)
- *B01D 11/04* (2006.01)

(52) U.S. Cl. .................. 422/139; 210/634; 422/146; 422/140; 422/144; 422/145

(58) Field of Classification Search ................. 422/139, 422/140, 146, 147, 144, 145; 210/634, 642; 208/39, 45, 86, 87, 96, 309

See application file for complete search history.

(56) References Cited

U.S. PATENT DOCUMENTS

| | | | | |
|---|---|---|---|---|
| 2,356,254 | A | * | 8/1944 | Blair, Jr. et al. ............. 507/242 |
| 3,725,250 | A | | 4/1973 | Wilson et al. |
| 4,419,214 | A | * | 12/1983 | Balint et al. ................ 208/402 |
| 4,528,100 | A | | 7/1985 | Zarchy |
| 4,875,998 | A | * | 10/1989 | Rendall ...................... 208/390 |
| 5,326,456 | A | * | 7/1994 | Brons et al. .................. 208/39 |
| 5,504,063 | A | * | 4/1996 | Becker et al. ............... 507/243 |
| 5,843,301 | A | * | 12/1998 | Esztergar et al. ........... 208/309 |
| 2001/0002654 | A1 | * | 6/2001 | Hood et al. ................. 208/309 |
| 2004/0031725 | A1 | | 2/2004 | Nagamatsu et al. |
| 2004/0069685 | A1 | | 4/2004 | Inomata et al. |

FOREIGN PATENT DOCUMENTS

| | | | |
|---|---|---|---|
| CA | 2316084 A1 | * | 2/2002 |
| EP | 0757091 | | 2/1997 |
| JP | 11-080750 | | 3/1999 |
| JP | 2000-080905 | | 3/2000 |
| JP | 2000-273467 | | 10/2000 |
| JP | 2001-089769 | | 4/2001 |
| JP | 2001-527615 | | 12/2001 |
| JP | 2002-302680 | | 10/2002 |
| JP | 2007084753 A | * | 4/2007 |
| WO | 98/45387 | | 10/1998 |
| WO | 02/34865 | | 5/2002 |
| WO | 02/44307 A1 | | 6/2002 |

\* cited by examiner

*Primary Examiner*—Walter D Griffin
*Assistant Examiner*—Huy-Tram Nguyen
(74) *Attorney, Agent, or Firm*—Mattingly & Malur, P.C.

(57) ABSTRACT

In a method for producing gas turbine fuel through the step of modifying heavy fuel oil with the use of an asphaltene-insoluble solvent, the utilization factor of the heavy fuel oil usable as gas turbine fuel is increased by making asphaltene selectively removable. A solvent having a specific inductive capacity in the range of 1.4 to 2.0 is used as the asphaltene-insoluble solvent. In particular, water controlled in temperature and pressure so as to have a specific inductive capacity in the above range is used as the asphaltene-insoluble solvent. By using such a solvent, an asphaltene component contained in the heavy fuel oil can be selectively removed and power generation can be performed while utilizing 95% or more of the heavy fuel oil.

7 Claims, 7 Drawing Sheets

METHOD FOR PRODUCING GAS TURBINE FUEL, AND METHOD AND SYSTEM FOR GENERATING ELECTRIC POWER BY GAS TURBINE

BACKGROUND OF THE INVENTION

1. Field of the Invention

The present invention relates to a method for upgrading heavy fuel oil and producing gas turbine fuel, and also relates to a method and system for generating electric power by a gas turbine.

2. Description of the Related Art

Heavy fuel oil has hitherto been mainly used in equipment aiming at generation of electric power and supply of heat by a boiler. Meanwhile, studies have recently been made with intent to use heavy fuel oil as gas turbine fuel. When heavy fuel oil is used as gas turbine fuel, it is required to reduce contaminant/impurity of heavy metals contained in the heavy fuel oil, particularly vanadiums. The reason is that vanadium causes corrosion of a gas turbine under high temperatures. One method of reducing the vanadium contaminant/impurity comprises the steps of mixing heavy fuel oil with water, and decomposing the heavy fuel oil under a reaction condition where water is brought into a supercritical or sub-supercritical state, for separation into a light oil component and a residual component, the light oil component being used as the gas turbine fuel (see, e.g., Patent Reference 1: JP-A-11-80750 (Abstract)). According to another method, an asphaltene component in the heavy fuel oil is separated and removed by using an asphaltene-insoluble solvent, such as pentane or isobutane, whereby vanadium contained in the asphaltene component is removed and other components are used as the gas turbine fuel (see, e.g., Patent Document 2: Domestic Re-Publication of PCT Publication WO2002/044307 (page 9, 10-20 lines).

SUMMARY OF THE INVENTION

The method of decomposing the heavy fuel oil into the light oil component by utilizing water under the supercritical or sub-supercritical state and of using the light oil component as the gas turbine fuel is disadvantageous in that a proportion of the heavy fuel oil usable as the gas turbine fuel is small and the utilization factor of the heavy fuel oil is low.

An object of the present invention is to provide a method for reducing the vanadium contaminant/impurity by removing an asphaltene component contained in heavy fuel oil with the use of an asphaltene-insoluble solvent, in which the asphaltene component can be selectively removed and the utilization factor of the heavy fuel oil as gas turbine fuel can be increased.

To achieve the above object, the present invention provides a method for producing gas turbine fuel through the steps of bringing heavy fuel oil into contact with an asphaltene-insoluble solvent and removing an asphaltene component contained in the heavy fuel oil, thereby reducing vanadium contaminant/impurity, wherein the solvent is a solvent having a specific inductive capacity in the range of 1.4 to 2.0.

Also, the present invention provides a method for generating electric power through the steps of producing gas turbine fuel by mixing heavy fuel oil into contact with an asphaltene-insoluble solvent and removing an asphaltene component contained in the heavy fuel oil, thereby reducing vanadium contaminant/impurity, and of driving a gas turbine by using, as gas turbine fuel, the heavy fuel oil from which the asphaltene component has been removed, wherein the solvent is a solvent having a specific inductive capacity in the range of 1.4 to 2.0.

Further, the present invention provides a system for generating electric power by a gas turbine, wherein the system includes an asphaltene removing unit for mixing heavy fuel oil into contact with an asphaltene-insoluble solvent, which has a specific inductive capacity in the range of 1.4 to 2.0, and for removing an asphaltene component contained in the heavy fuel oil, thereby reducing vanadium contaminant/impurity.

According to the present invention, it is possible to selectively remove the asphaltene component among the components contained in the heavy fuel oil, and to increase the utilization factor of the heavy fuel oil used as the gas turbine fuel.

DESCRIPTION OF THE PREFERRED EMBODIMENTS

Figure 1:
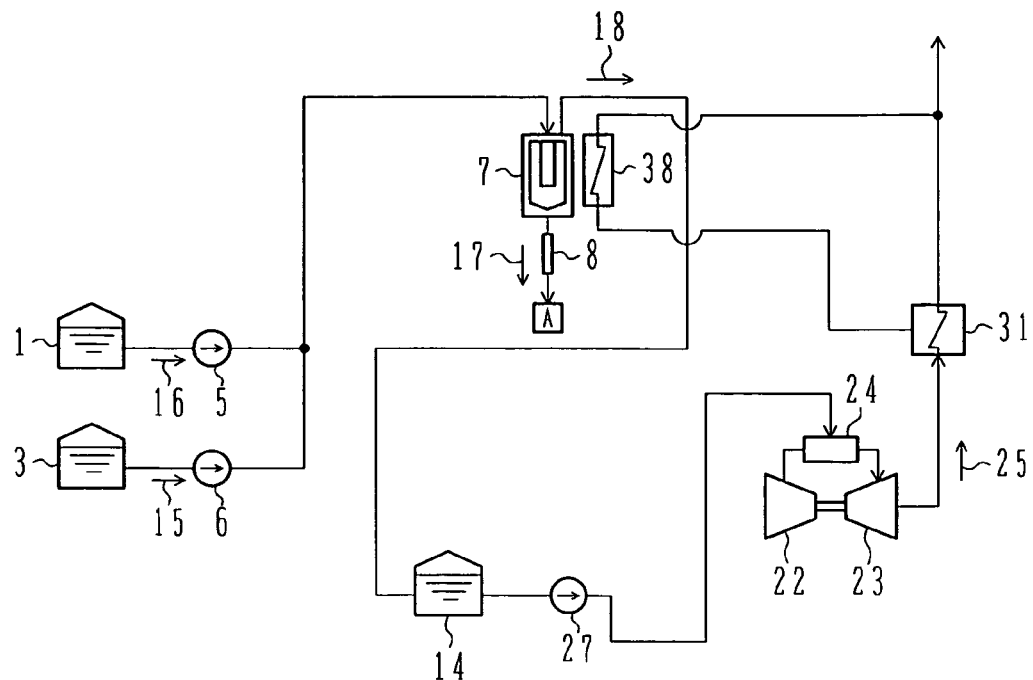
FIG. 1 is a diagram of a gas-turbine power generating system according to a first embodiment of the present invention.

The present invention is based on finding, in relation to a method for treating heavy fuel oil with an asphaltene-insoluble solvent, the fact that insolubility of an asphaltene component depends on the specific inductive capacity of the solvent and the asphaltene component can be selectively separated and removed when the specific inductive capacity of the solvent is in the range of 1.4 to 2.0. If the specific inductive capacity of the asphaltene-insoluble solvent is smaller than 1.4, the asphaltene component is also dissolved in the solvent and the asphaltene component cannot be selectively removed from the heavy fuel oil. If the specific inductive capacity of the asphaltene-insoluble solvent is larger than 2.0, a light oil component in the heavy fuel oil also becomes insoluble in the solvent and the amount of fuel capable of being supplied to a gas turbine is reduced. A preferable solvent is water and propane. In the case of water, the specific inductive capacity can be adjusted to fall in the range of 1.4 to 2.0 by controlling temperature and pressure. In the case of propane, the specific inductive capacity can be adjusted to fall in the range of 1.4 to 2.0 by pressurizing propane at room temperature. Further, when water is used as the solvent, a mass traction of water/oil is desirably in the range of about 0.5 to 1.5.

If products produced with combustion of the asphaltene-insoluble solvent cause no damages to a gas turbine combustor and other components of the gas turbine, the heavy fuel oil from which the asphaltene component has been removed and the solvent can be both simultaneously burnt in the gas turbine combustor. In that case, in principle, all other components of the heavy fuel oil which is free from the asphaltene component can be used as gas turbine fuel. From this point of view, too, it is very desirable to use water as the asphaltene-insoluble solvent.

Several aspects of the present invention will be described below. A first aspect of the present invention resides in a method for producing gas turbine fuel through the steps of mixing heavy fuel oil into contact with the asphaltene-insoluble solvent and removing the asphaltene component contained in the heavy fuel oil, thereby obtaining the gas turbine fuel. In the gas-turbine fuel producing method, it is desired that the heavy fuel oil and the solvent be held in a mixed state until the asphaltene component is extracted and separated from the heavy fuel oil. The mixed state is desirably held under temperature and pressure conditions where the specific inductive capacity of the solvent is controlled in the range of 1.4 to 2.0. To that end, the solvent having the specific inductive capacity adjusted to fall in the range of 1.4 to 2.0 in advance may be mixed with the heavy fuel oil. Alternatively, after mixing the solvent and the heavy fuel oil, the temperature and pressure of the mixture may be adjusted so that the specific inductive capacity of the solvent is controlled in the range of 1.4 to 2.0.

Figure 3A:
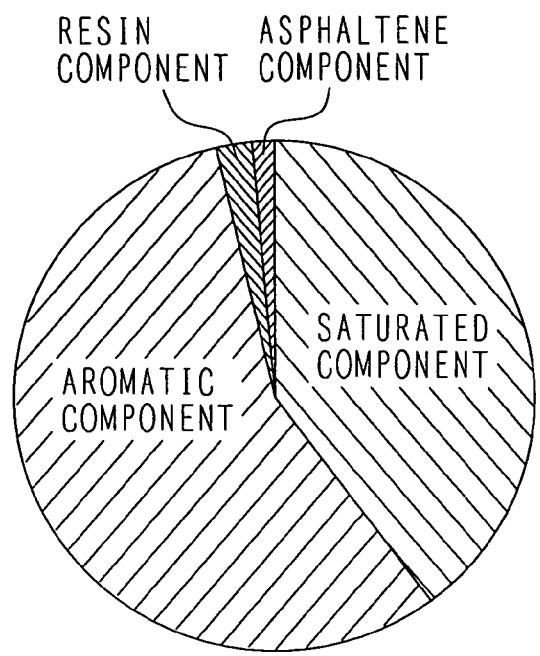
FIGS. 3A and 3B are circle graphs showing component proportions and a vanadium content in heavy fuel oil, respectively.
Figure 3B:
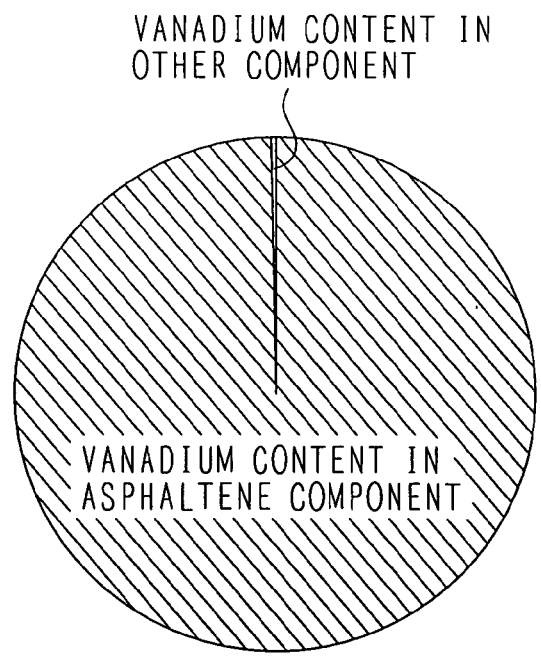

FIG. 3A shows component rations of heavy fuel oil, and FIG. 3B shows a vanadium content in the heavy fuel oil. In one example shown in FIG. 3A, an asphaltene component contained in the heavy fuel oil is about 2%. As shown in FIG. 3B, substantially 99% of vanadium contaminant in the heavy fuel oil is contained in the asphaltene component. This means that if 2% of the asphaltene component contained in the heavy fuel oil can be selectively removed, substantially 99% of vanadium in the heavy fuel oil can be also removed. In general, when the heavy fuel oil is used in the gas turbine, vanadium contaminant/impurity in fuel is desirably restricted to be not larger than 0.5 ppm by weight from the viewpoint of preventing hot corrosion under high temperatures due to vanadium oxide. In the case of heavy fuel oil, as described above, the vanadium contaminant/impurity in fuel can be controlled to be not larger than 0.5 ppm by weight by removing the asphaltene component. Further, because the asphaltene component occupies about 2% of the heavy fuel oil, about 98% of the heavy fuel oil can be utilized as the gas turbine fuel by selectively removing the asphaltene component. An extraction rate of the asphaltene component is affected by the time, temperature and pressure during and at which the heavy fuel oil and the solvent are held in the mixed state. By controlling those conditions, it is possible to control the extraction rate of the asphaltene component and to increase the utilization factor of the heavy fuel oil as the gas turbine fuel over 95%.

A second aspect of the present invention resides in driving the gas turbine and generating electric power by using the gas turbine fuel produced according to the method of the present invention. This aspect can be practiced in various forms by utilizing combustion heat of the removed asphaltene component or exhaust heat of the gas turbine. For example, the asphaltene component removed from the heavy fuel oil is burnt solely or with the aid of another fuel to generate high-temperature combustion gas. The generated combustion gas is employed as a heating source for adjusting the specific inductive capacity of water, which is used as the solvent in the asphaltene removing process, to be controlled in the range of 1.4 to 2.0. Thus, the heat generated by burning the asphaltene component is indirectly recovered by the gas turbine through the water serving as the solvent.

In another form, the exhaust gas discharged from the gas turbine is employed as a heating source for adjusting the specific inductive capacity of water, which is used as the solvent in the asphaltene removing process, to be controlled in the range of 1.4 to 2.0, or as a heating source for performing the asphaltene removing process of the mixture of the heavy fuel oil and the water under temperature and pressure conditions at which the specific inductive capacity of the water is controlled in the range of 1.4 to 2.0. Thus, the heat of the exhaust gas discharged from the gas turbine is recovered through the water serving as the solvent or through the heavy fuel oil. Instill another form, the heat of the exhaust gas discharged from the gas turbine is recovered to generate steam. The generated steam is employed as a heating source for adjusting the specific inductive capacity of water, which is used as the solvent in the asphaltene removing process of the heavy fuel oil, to be controlled in the range of 1.4 to 2.0, or as a heating source for performing the asphaltene removing process from the mixture of the heavy fuel oil and the water under temperature and pressure conditions at which the specific inductive capacity of the water is controlled in the range of 1.4 to 2.0. Thus, the heat of the exhaust gas discharged from the gas turbine is recovered by the gas turbine through the water serving as the solvent or through the heavy fuel oil. The method using steam generated by recovering the exhaust gas of the gas turbine is advantageous in that corrosion of piping, etc. can be reduced in comparison with the method of directly using the exhaust gas of the gas turbine.

A third aspect of the present invention resides in a system for generating electric power by a gas turbine using the gas turbine fuel produced according to the method of the present invention. In one form of the power generating system, the gas-turbine power generating system includes an asphaltene burning unit in which the asphaltene component removed from the heavy fuel oil by mixing the heavy fuel oil into contact with the asphaltene-insoluble solvent is burnt solely or with the aid of another fuel. Generated high-temperature combustion gas is employed as a heating source for adjusting the specific inductive capacity of water, which is used as the solvent in the asphaltene removing process, to be controlled in the range of 1.4 to 2.0. Thus, the heat generated by burning the asphaltene component is indirectly recovered by the gas turbine through the water serving as the solvent.

The asphaltene component generates the heat amount of about 3000-5000 kcal/kg and is able to sustain stable combustion with its own generated heat amount. The asphaltene component is lack in fluidity and is solid at ordinary temperature. The asphaltene component is usually applied only as asphalt paved on roads, etc. Therefore, the asphaltene component is desirably treated immediately after removing. With one form of the third aspect, the combustion heat of the asphaltene component can be utilized to heat the water serving as the solvent and recovered by the gas turbine. The asphaltene component is about 2% of all components of the heavy fuel oil and is not thermally sufficient from the viewpoint of burning the asphaltene component in a boiler to generate steam for generation of electric power by a steam turbine. However, the heat generated by the asphaltene component is sufficient to heat the water for controlling the specific inductive capacity of the water that is used as the solvent for removing the asphaltene component.

In another form of the power generating system, the exhaust gas discharged from the gas turbine is applied as a heating source for adjusting the specific inductive capacity of water, which is used in the asphaltene removing process, to be controlled in the range of 1.4 to 2.0, or as a heating source for performing the asphaltene removing process of the mixture of the heavy fuel oil and the water under temperature and pressure conditions at which the specific inductive capacity of the water is controlled in the range of 1.4 to 2.0. Thus, the heat of the exhaust gas discharged from the gas turbine is recovered by the gas turbine through the water serving as the solvent or through the heavy fuel oil. The exhaust heat of the gas turbine is at high temperatures of not lower than 500☐C and therefore sufficiently usable to heat the water that is used as the solvent for removing the asphaltene component.

In still another form, the power generating system includes an exhaust heat recovery boiler for recovering the heat of the exhaust gas discharged from the gas turbine and for generating steam. The steam generated by the exhaust heat recovery boiler is applied as a heating source for adjusting the specific inductive capacity of water, which is used in the asphaltene removing process, to be controlled in the range of 1.4 to 2.0, or as a heating source for performing the asphaltene removing process from the mixture of the heavy fuel oil and the water under temperature and pressure conditions at which the specific inductive capacity of the water is controlled in the range of 1.4 to 2.0. Thus, the heat of the exhaust gas discharged from the gas turbine is recovered by the gas turbine through the water serving as the solvent or through the heavy fuel oil. As an option, the combustion heat of the asphaltene component and the exhaust heat of the gas turbine may be used in combined manner to heat the water that is used as the solvent for removing the asphaltene component.

The asphaltene component is a high molecular compound whose molecular weight is about 1000-100000 in average and is the heaviest component in the heavy fuel oil. Therefore, the asphaltene component has a larger density than the mixture of other components of the heavy fuel oil and the solvent, and it is easily dropped in the mixture by gravity to be collected in a lower portion. Taking into account such a property, it is desirable in the third aspect of the present invention to selectively extract only the asphaltene component by utilizing the density difference and gravity. According to the third aspect of the present invention, the process from a stage of producing the gas turbine fuel with the heavy fuel oil used as raw materials to a stage of generating electric power can be practiced on site.

The gas-turbine power generating system of the present invention, in which water is used as the asphaltene-insoluble solvent, comprises, by way of example, units for supplying and pressurizing heavy fuel oil and water, an asphaltene removing unit for mixing the heavy fuel oil and the water and for removing an asphaltene component from the heavy fuel oil, a unit for burning the removed asphaltene component solely or with the aid of another fuel, a unit for performing heat exchange among combustion gas of the asphaltene component, the water and the heavy fuel oil, and a unit for depressurizing a mixture of the water and the heavy fuel oil from which the asphaltene component has been removed. The gas-turbine power generating system further comprises a unit for separating a gas component and a liquid component in the mixture of the heavy fuel oil and the water, a reservoir unit for storing the separated liquid component, a gas turbine, a unit for supplying the stored liquid component to the gas turbine, a unit for supplying the gas component in the mixture of the heavy fuel oil and the water to the gas turbine, and a generator for the gas turbine. With that construction, combustion exhaust gas of the asphaltene component removed from the heavy fuel oil can be utilized to heat the water so that the specific inductive capacity of the water is controlled in the range of 1.4 to 2.0. The heat of the asphaltene component can be recovered by the gas turbine by supplying the heated water to a gas turbine combustor in a state where the heated water is mixed with the heavy fuel oil from which the asphaltene component has been removed. Before being supplied to the gas turbine combustor, the mixture of the water and the heavy fuel oil without asphaltene component is adjusted in pressure by the depressurizing unit so as to satisfy the fuel pressure condition under which fuel is usually supplied to the gas turbine combustor. At that time, the temperature of the mixture is reduced with adiabatic expansion resulting from the depressurization, and the mixture is separated into a gas component and a liquid component. The gas component and the liquid component are separated from each other by a gas-liquid separator. The gas component is directly supplied to the gas turbine combustor, while the liquid component is temporarily stored in the reservoir unit and then supplied to the gas turbine combustor. Accordingly, the heavy fuel oil without the asphaltene component can be all supplied to the gas turbine.

A fourth aspect of the present invention resides in a gas-turbine combined power generating system which includes an exhaust heat recovery boiler installed downstream of a gas turbine and generates steam by utilizing exhaust gas of the gas turbine, thereby driving a steam turbine. The exhaust gas of the gas turbine is at high temperature of not lower than 500☐C. Even when water is used as the asphaltene-insoluble solvent and the exhaust gas of the gas turbine is utilized to increase the temperature of the water for reducing the specific inductive capacity of the. water through the exhaust heat recovery boiler, the exhaust gas of the gas turbine still has sufficient thermal energy. Thus, because steam is produced by the exhaust heat recovery boiler and the steam turbine is driven by the produced steam, overall efficiency of the power generating system can be increased. Hence the heavy fuel oil can be effectively converted to electric power.

In the present invention, the asphaltene component is defined as a high molecular compound having molecular weight of about 1000-100000 in which a condensed polycyclic aromatic compound has a layer structure. That definition is the same as the definition of the asphaltene component which is usually employed in the industrial field, and it is not particular one specific to the present invention.

The specific inductive capacity is a physical property value related to the polarity of the asphaltene-insoluble solvent. The solvent in a state having a large specific inductive capacity is able to dissolve well a substance having a large polarity, which is represented by an inorganic substance such as salt, but it can hardly dissolve a substance having a small polarity, such as an organic substance. Water at ordinary temperature has a very large specific inductive capacity of about 80 and therefore cannot dissolve an organic substance such as oil. In general, however, the specific inductive capacity of a solvent is gradually reduced with an increase of the temperature and pressure, and finally takes a very small value of about 2 or below. For example, water in such a state solves well with oil contrary to water at ordinary temperature. Conversely, inorganic salt hardly dissolves in the water in such a state.

Figure 4:
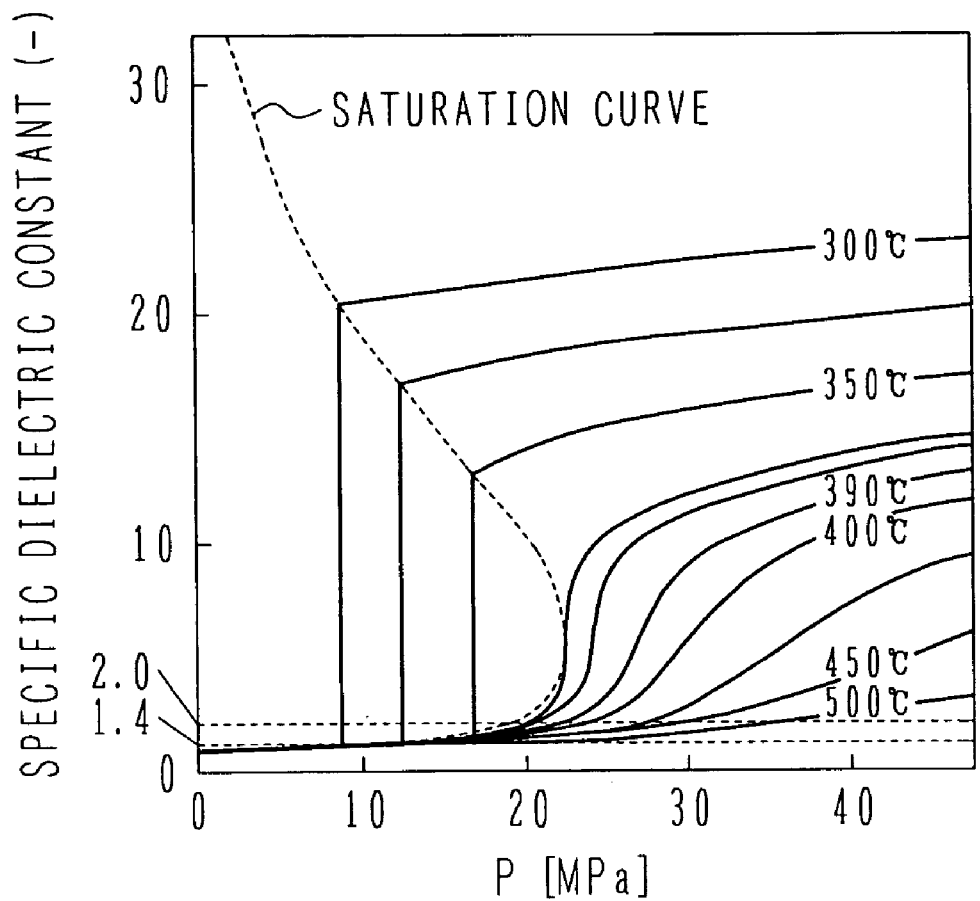
FIG. 4 is a graph showing changes of a specific inductive capacity depending on temperature and pressure, taking water as an example.

FIG. 4 shows influences of temperature and pressure upon the specific inductive capacity of water. In combination of the lowest temperature and pressure, the specific inductive capacity of water can be controlled in the range of 1.4 to 2.0 even at values of about 350°C and 16 MPa. Particularly, in the range of 430 to 460°C of water temperature in FIG. 4, another effect is expected in that the heavy fuel oil from which the asphaltene component has been removed is partly converted to gas through decomposition by heat, thus resulting in reduction of weight as a whole. This point is advantageous in that viscosity of the heavy fuel oil can be reduced and more effectively supplied to the gas turbine combustor.

Examples of the heavy fuel oil usable in the present invention include, though not limited, crude oil, gas oil, heavy fuel oil, normal-pressure residual oil, reduced-pressure residual oil, bitumen, and bio oil such as palm oil and palm shell oil.

Figure 5:
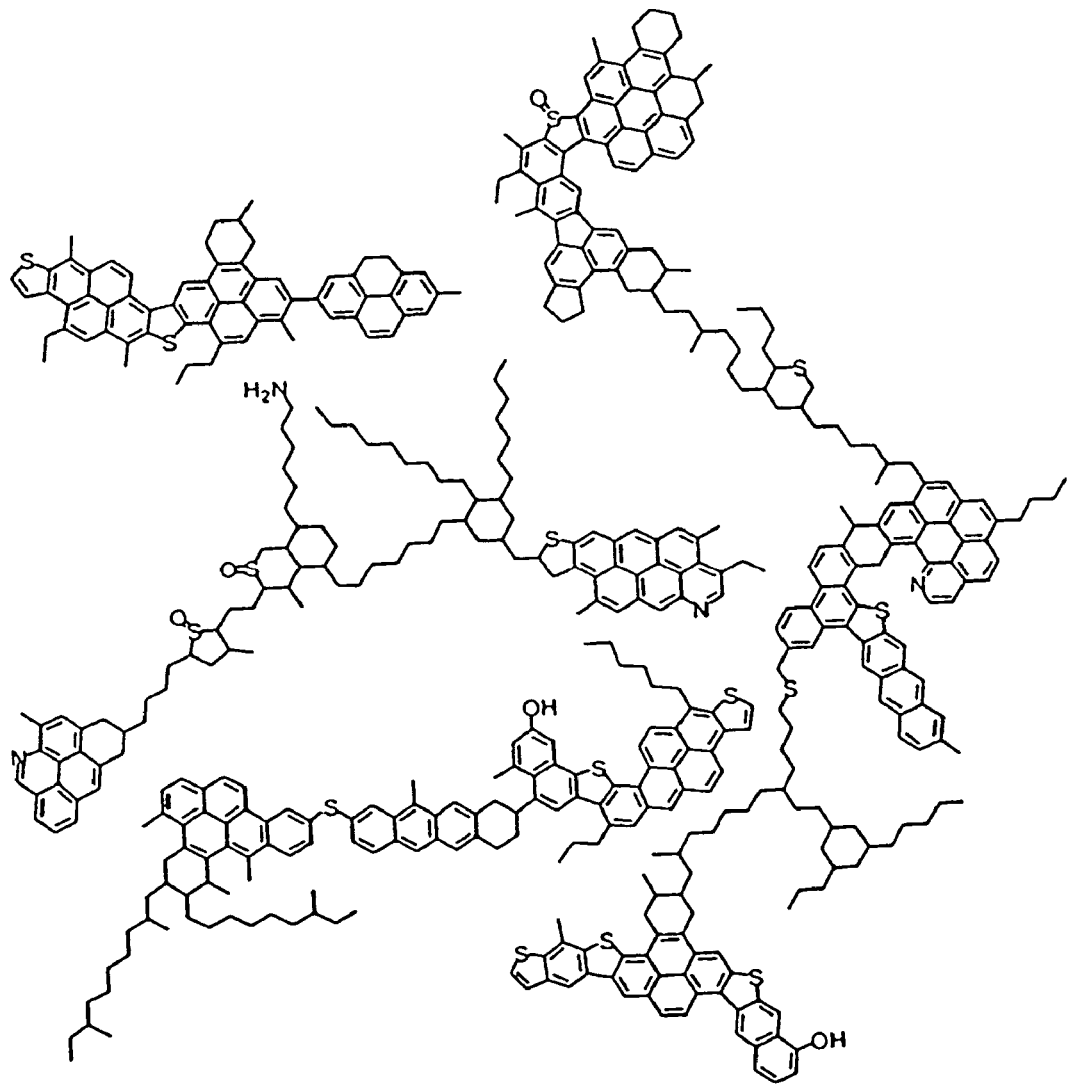
FIG. 5 illustrates one example of a molecular structure model of an asphaltene component.

In general, oil properties, e.g., viscosity, and contents of impurities, e.g., vanadium, in oil differ depending on proportions of a saturated component, an aromatic component, a resin component, and an asphaltene component. The saturated component includes saturated hydrocarbons having molecular weight of 300-2000, which are called paraffin and naphthene. The aromatic component includes the so-called aromatics having molecular weight of 500-2000. Those components are collectively called an oil component. The resin component includes condensed polycyclic aromatic compounds having molecular weight of 500-50000. The asphaltene component includes high molecular compounds having molecular weight of about 1000-100000 in which condensed polycyclic aromatic compounds have layer structures. FIG. 5 illustrates one typical molecular structure model of the asphaltene component. In the example of FIG. 5, the molecular weight is about 7000. The resin and other oil components usually have a density of about 0.9 g/cm$^3$, while the asphaltene component has a density of not smaller than 1.0 g/cm$^3$ and is heavier than water. The softening point of the asphaltene component, at which fluidity is developed, is about 45-55°C. Usually, the fuel oil that is called heavy fuel oil is featured in containing the resin and asphaltene components at a high proportion. The heavy fuel oil contains about 2% for each of the resin and asphaltene components. The asphaltene component includes heavy metals such as sulfur, nitrogen and vanadium. In particular, 99% of vanadium contained in the heavy fuel oil is contained in the asphaltene component of the heavy fuel oil.

Of impurities contained in the heavy fuel oil, sodium, potassium, calcium and other components can be relatively easily removed by water washing and alkali washing, for example, as well known in the field of desalting equipment. In the present invention, the asphaltene-insoluble solvent is mixed with the heavy fuel oil to form a homogeneous dissolved mixture of the other components of the heavy fuel oil than the asphaltene component and the solvent. By utilizing the density difference between the mixture and the asphaltene component and the action of gravity, the asphaltene component is separated from the mixture. Simultaneously, impurities contained in the asphaltene component are removed. Whether the asphaltene component is soluble in the solvent or not is decided depending on the specific inductive capacity of the solvent. When water is used as the solvent, the specific inductive capacity of the water is in the range of about 1.4 to 2.0 under conditions of not lower than 15 MPa and 350°C. That range of the specific inductive capacity satisfies the condition at which the asphaltene component becomes selectively insoluble.

The temperature and pressure conditions of the heavy fuel oil to be mixed in the solvent are desirably the same as the conditions of the solvent because the specific inductive capacity of the solvent is affected by the temperature and pressure conditions of the heavy fuel oil.

In order to remove the asphaltene component from the mixture of the solvent and the heavy fuel oil by utilizing the density difference and gravity, the density of the solvent is desirably smaller than that of the asphaltene component. Water is the solvent satisfying such a condition.

An experiment was performed by using, heavy fuel oil containing 96.5% by weight of the saturated component and the aromatic component, 2% by weight of the resin component, 1.5% by weight of the asphaltene component, and 4.6 ppm by weight of vanadium, using water as the asphaltene-insoluble solvent, and mixing the water with the heavy fuel oil after controlling the specific inductive capacity of the water to be 1.5 under conditions of pressure of 20 MPa and temperature of 450°C. As a result, the heavy fuel oil after removing the asphaltene component contained 98.3% by weight of the saturated component and the aromatic component, 1.7% by weight of the resin component, 0% of the asphaltene component, and not larger than 0.1 ppm by weight of vanadium.

From the above result, it was found that the asphaltene component was completely removed and vanadium contained in the asphaltene component was also removed. It was also confirmed that only the asphaltene component could be selectively removed with no substantial changes of the other components by using, as the asphaltene-insoluble solvent, the water having the specific inductive capacity controlled to 1.5. Additionally, in that case, the heavy fuel oil after removing the asphaltene component can be all used as the gas turbine fuel.

The asphaltene removing unit for removing the asphaltene component from the heavy fuel oil is desirably constructed such that the heavy fuel oil and the solvent are supplied to a reactor vessel separately or after mixing, in which the heavy fuel oil and the content are to be mixed, from a relatively upper portion of the reactor vessel. In either case of separate supply or supply after mixing, the asphaltene component insoluble in the solvent is naturally separated due to the density difference and is collected in a relatively lower portion of the reactor vessel. The shape of the reactor vessel is not limited to particular one so long as the collected portion of the asphaltene component is positioned relatively lower than the portion at which the heavy fuel oil and the solvent are supplied. A certain time is required for the asphaltene component to separate from the mixture of the water and the heavy fuel oil, from which the asphaltene component is removed, and to drop into the relatively lower portion due to the density difference and gravity. That time is optimally 1.5 to 2 minutes. When the solvent temperature is not lower than 450°C, the time is desirably within 5 minutes because a carbon component is precipitated from the mixed heavy fuel oil. The operation from the mixing of the heavy fuel oil and the solvent to the separation of the asphaltene component may be performed in a continuous flow process or in batches. A certain time is required from the mixing of the heavy fuel oil and the solvent to separate of the asphaltene component. In the case of the operation in a continuous flow process, the appropriate reaction time can be obtained by deciding the size of the reactor vessel depending on the supply amount of the heavy fuel oil and the solvent. In the case of the operation in the batch reactor, the process from the mixing to the separation of the asphaltene component may be performed in match with the appropriate reaction time.

In the case of the solvent, like water, having the specific inductive capacity in the range of 1.4 to 2.0 under high-temperature and high-pressure conditions of not lower than 15 MPa and 350°C, heating and pressurizing units are required to be provided. The heating unit is desirably an electric heater when radiation heating is used, and steam or high-temperature gas when convection heating is used. In the present invention, it is desired that high-temperature exhaust gas generated in the process of burning the asphaltene component be used as a source for heating the water. It is further desired that the solvent and the heavy fuel oil be mixed with each other under the condition at which the specific inductive capacity of the solvent is controlled in the range of 1.4 to 2.0. The heating unit for the heavy fuel oil is also desirably an electric heater when radiation heating is used, and steam or high-temperature gas when convection heating is used. However, should a heat conducting section for heating the heavy fuel oil be damaged, there is a risk that the heavy fuel oil may leak into a high-temperature atmosphere. From the viewpoint of preventing a fire, therefore, a high-temperature heating region is desirably free from oxygen or held at an oxygen amount not higher than a flammable limit level. The exhaust gas generated in the process of burning the asphaltene component is a preferable heating source satisfying that condition.

When electric power is generated by using a gas turbine, the cheapest oil fuel commercially available at present is heavy fuel oil that is about 10-17% cheaper than gas oil. Taking the heavy fuel oil as an example for that reason, the heavy fuel oil after removing the asphaltene component is preferably supplied to the gas turbine at 95% or more. The asphaltene content in the heavy fuel oil, which is to be used in the present invention, is not larger than 5%, thus meeting the above condition.

The heavy fuel oil after removing the asphaltene component is desirably burnt in the gas turbine at once from the viewpoint of recovering thermal energy. Apart from the recovery of thermal energy, however, a part of the heavy fuel oil may be transported to and used in an external power generation facility. The gas-turbine power generating method using the heavy fuel oil and the construction of the power generating system according to the present invention will be described below with reference to the drawings.

First Embodiment

FIG. 1 shows a first embodiment in which water having the specific inductive capacity adjusted to fall in the range of 1.4 to 2.0 is used as the asphaltene-insoluble solvent. In FIG. 1, heavy fuel oil 16 supplied from a heavy fuel oil storage tank 1 is pressurized by a heavy fuel oil pump 5 to a level at which the specific inductive capacity of water is controlled in the range of 1.4 to 2.0. Also, water supplied as a solvent 15 from a solvent tank 3 is similarly pressurized by a solvent pump 6 to a level at which the specific inductive capacity of the water is controlled in the range of 1.4 to 2.0. The heavy fuel oil and the solvent are supplied to a mixer 7 after being merged with each other. The mixer 7 corresponds to the asphaltene removing unit in the present invention. In the mixer 7, other components in the heavy fuel oil than an asphaltene component 17 are dissolved in the solvent to form a homogeneous mixture. The asphaltene component 17 is collected in a lower portion of the mixer 7 by gravity because it is insoluble in the water having the specific inductive capacity in the range of 1.4 to 2.0 and has a larger density than the water and the heavy fuel oil components dissolved in the water. The asphaltene component 17 collected in the mixer lower portion is discharged to the outside of the mixer 7 through an asphaltene extracting portion 8 provided under the mixer 7. A mixture 18 of the solvent and the heavy fuel oil from which the asphaltene component has been removed is temporarily stored in a mixture reservoir 14 and then supplied to a gas turbine combustor 24 by a transfer pump 27. With the arrangement described above, 95% or more of the heavy fuel oil supplied from the heavy fuel oil storage tank 1 can be supplied to the gas turbine combustor 24. As a result, highly efficient power generation using the heavy fuel oil can be realized by driving a gas turbine 23 while using 95% or more of inexpensive heavy fuel oil as gas turbine fuel. In this embodiment, heat of gas turbine exhaust gas 25 is recovered by an exhaust heat recovery boiler 31, and steam generated by the exhaust heat recovery boiler 31 is supplied to a heater 38 for heating the mixer 7.

Figure 6:
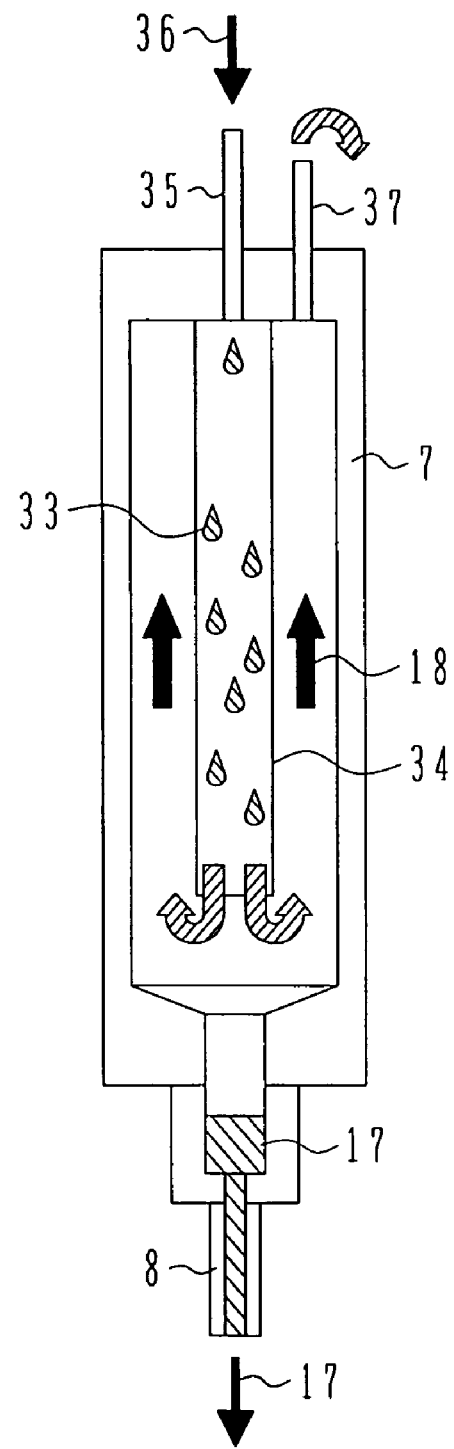
FIG. 6 is a schematic view showing one example of structure of a mixer for performing a process of removing asphaltene from the heavy fuel oil.

FIG. 6 shows a structure of the mixer 7. A mixture 36 of the heavy fuel oil and the solvent is supplied to the mixer 7 through an inlet 35, and the asphaltene component insoluble in the solvent is floated in the form of droplets 33 in the mixture 36. Because the droplets 33 of the asphaltene component have a larger density than the mixture 36, the droplets are dropped to and collected in the lower portion of the mixer 7 by gravity. The collected asphaltene component 17 is discharged to the outside of the mixer 7 through the asphaltene extracting portion 8.

Second Embodiment

Figure 2:
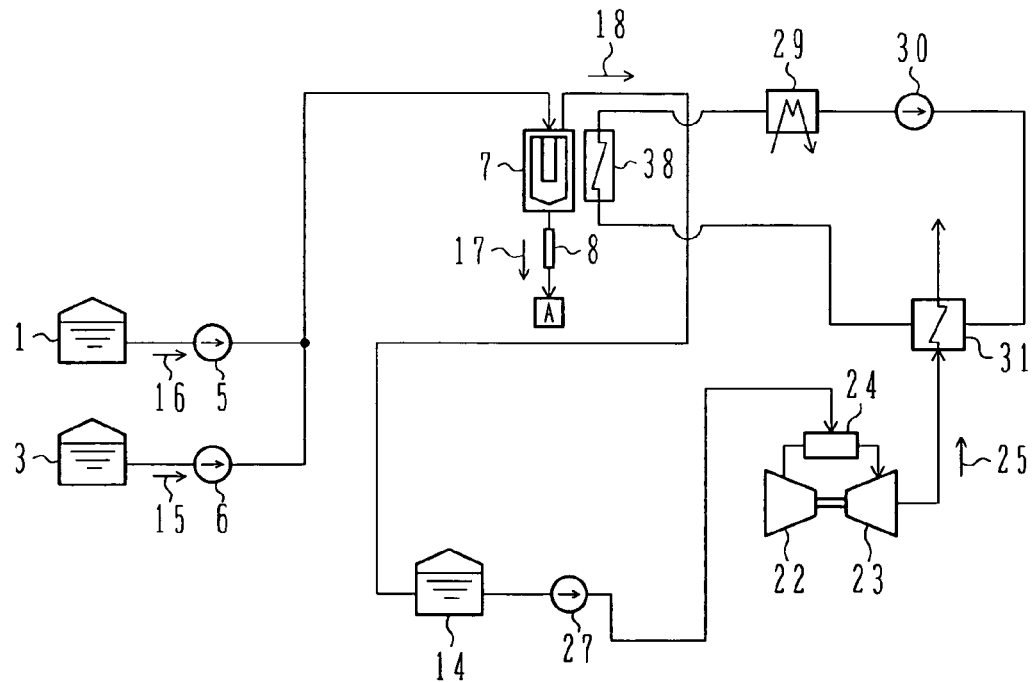
FIG. 2 is a diagram of a gas-turbine power generating system according to a second embodiment of the present invention.

FIG. 2 shows a second embodiment in which water is used as the solvent. This second embodiment differs from the first embodiment of FIG. 1 in that the exhaust heat is recovered in recirculation type. More specifically, after the steam generated by the exhaust heat recovery boiler 31 has been supplied to the heater 38 for heating the mixer 7, the steam is returned to the exhaust heat recovery boiler 31 through a condenser 29 and a pump 30.

Third Embodiment

Figure 7:
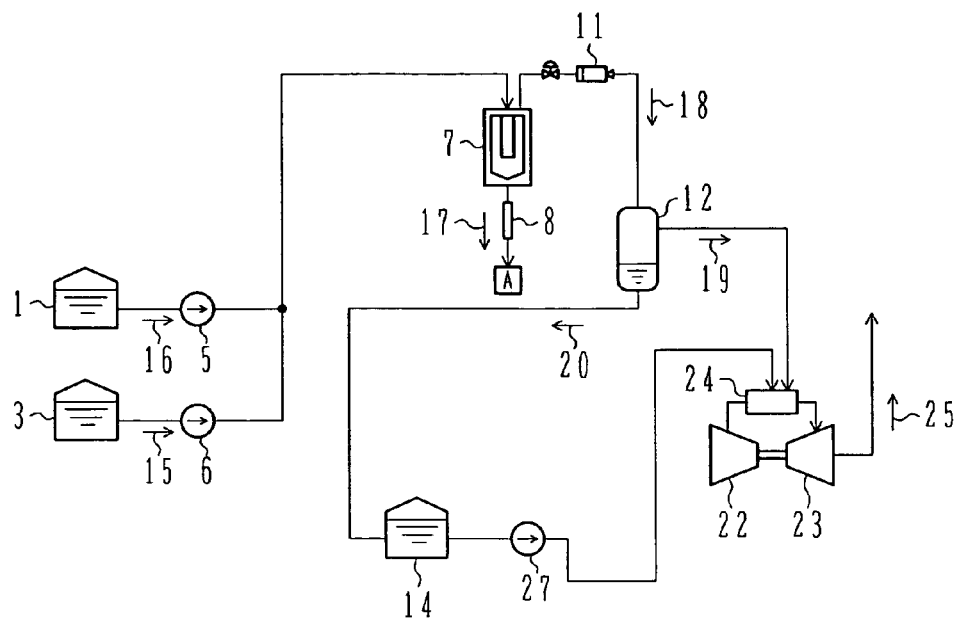
FIG. 7 is a diagram of a gas-turbine power generating system according to a third embodiment of the present invention.

FIG. 7 shows a third embodiment using, as the solvent, propane or the like of which specific inductive capacity can be adjusted to be in the range of 1.4 to 2.0 by pressurizing it at ordinary temperature. In FIG. 7, heavy fuel oil 16 supplied from a heavy fuel oil storage tank 1 is pressurized by a heavy fuel oil pump 5 to a level at which the specific inductive capacity of propane used as the solvent is controlled in the range of 1.4 to 2.0. Also, propane 15 supplied from a solvent storage tank 3 is similarly pressurized by a solvent pump 6 to a level at which the specific inductive capacity of the propane is controlled in the range of 1.4 to 2.0. The heavy fuel oil and the propane are then supplied to a mixer 7. In the mixer 7, other components in the heavy fuel oil than an asphaltene component 17 are dissolved in the propane to form a homogeneous mixture. The asphaltene component 17 is collected in a lower portion of the mixer 7 by gravity because it is insoluble in the propane having the specific inductive capacity in the range of 1.4 to 2.0 and has a larger density than the propane and the heavy fuel oil components dissolved in the propane. Therefore, the asphaltene component 17 can be easily extracted from the mixer 7. A mixture 18 of the propane and the heavy fuel oil from which the asphaltene component has been removed has pressure controlled such that the specific inductive capacity of the propane is controlled in the range of 1.4 to 2.0, and the mixture pressure may be higher than the pressure of fuel supplied to a gas turbine combustor 24. For that reason, the pressure of the mixture 18 is reduced by a depressurizer 11. At that time, due to adiabatic expansion resulting from the depressurization, the mixture 18 is brought into a mixed state of a vapor component 19 of both the heavy fuel oil and the solvent, and a liquid component 20 of the heavy fuel oil. Accordingly, the vapor component 19 and the liquid component 20 are separated from each other by a mist separator 12. The vapor component 19 is directly supplied to the gas turbine combustor 24, while the liquid component 20 is temporarily stored in a reservoir tank 14 and then supplied to the gas turbine combustor 24. Totalizing the vapor component 19 and the liquid component 20, 95% or more of the heavy fuel oil supplied from the heavy fuel oil storage tank 1 can be supplied to the gas turbine combustor 24. As a result, a gas turbine 23 can be driven while supplying 95% or more of inexpensive heavy fuel oil to the gas turbine combustor 24, and highly efficient power generation using the heavy fuel oil can be realized.

Fourth Embodiment

Figure 8:
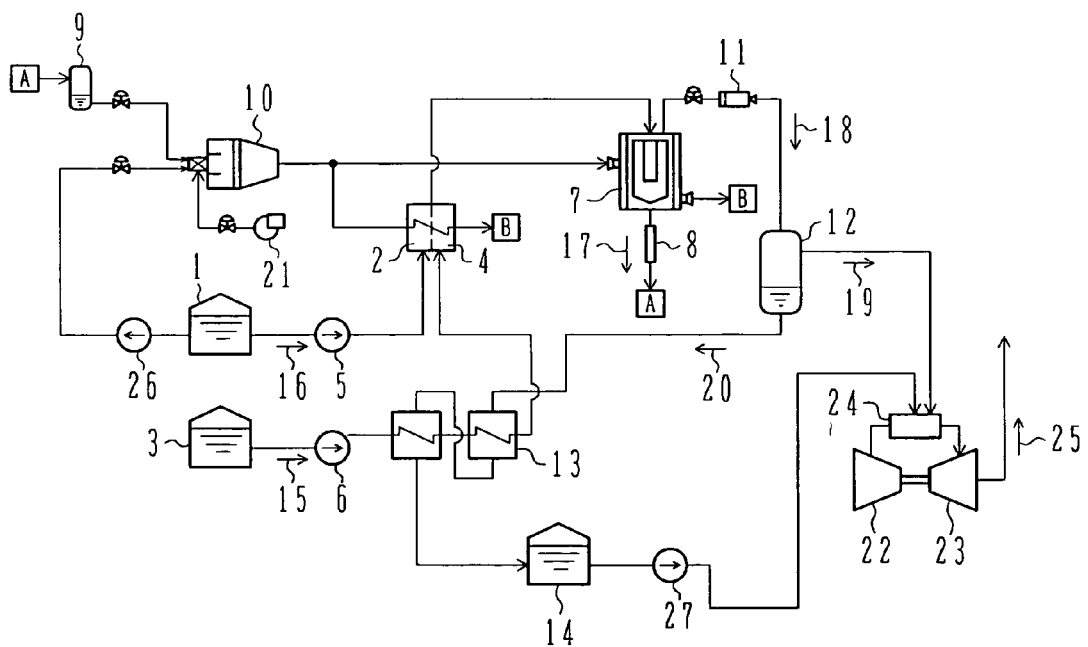
FIG. 8 is a diagram of a gas-turbine power generating system according to a fourth embodiment in which combustion gas of the asphaltene component is used to heat a solvent and the heavy fuel oil.

FIG. 8 shows a fourth embodiment in which water is used as the solvent. In FIG. 8, heavy fuel oil 16 supplied from a heavy fuel oil storage tank 1 is pressurized by a heavy fuel oil pump 5 to a level of preferably not lower than 15 MPa. Also, water supplied as a solvent 15 from a solvent storage tank 3 is similarly pressurized by a solvent pump 6 to a level of preferably not lower than 15 MPa. The reason why the heavy fuel oil 16 is pressurized is to avoid the specific inductive capacity of the water from being changed when the heavy fuel oil and the water are mixed with each other. Further, the water and the heavy fuel oil are heated respectively by a water heater 4 and a heavy fuel oil heater 2 so that the specific inductive capacity of the water is controlled in the range of 1.4 to 2.0 depending on the pressure. As with the pressure, the temperature of the water and the temperature of the heavy fuel oil are desirably the same so that the specific inductive capacity of the water is not changed with mixing of the water and the heavy fuel oil. The water and the heavy fuel oil are mixed in a mixer 7 under the appropriate temperature and pressure conditions at which the specific inductive capacity of the water is controlled in the range of 1.4 to 2.0. An asphaltene component 17 separated in the mixer 7 is extracted to the outside of the mixer 7 and is stored in an asphaltene reservoir tank 9. The asphaltene component 17 stored in the asphaltene reservoir tank 9 is supplied to an asphaltene combustion furnace 10 in which the asphaltene component 17 is burnt with air supplied from a blower 21. A part of the heavy fuel oil in the heavy fuel oil tank 1 may be supplied to the asphaltene combustion furnace 10 by a transfer pump 26 so as to serve as an aid for the combustion. High-temperature gas generated by the asphaltene combustion furnace 10 is used to heat the heavy fuel oil and the water. A mixture 18 of the water and the heavy fuel oil from which the asphaltene component has been removed generally has higher pressure than that of fuel supplied to a gas turbine combustor 24 because the pressure and temperature of the mixture 18 is controlled such that the specific inductive capacity of the water is controlled in the range of 1.4 to 2.0. For that reason, the pressure of the mixture 18 is reduced by a depressurizer 11. At that time, due to adiabatic expansion resulting from the depressurization, the mixture 18 is brought into a mixed state of a vapor component 19 and a liquid component 20. Accordingly, the vapor component 19 and the liquid component 20 are separated from each other by a gas-liquid separator 12. The vapor component 19 is directly supplied to the gas turbine combustor 24, while the liquid component 20 is temporarily stored in a reservoir 14 after being cooled by a cooler 13 to temperature of preferably about 60°C and is then supplied to the gas turbine combustor 24. In this embodiment, totalizing the vapor component 19 and the liquid component 20, 95% or more of the heavy fuel oil 16 supplied from the heavy fuel oil storage tank 1 can be supplied to the gas turbine combustor 24. As a result, a gas turbine 23 can be driven by combustion gas while supplying 95% or more of inexpensive heavy fuel oil to the gas turbine combustor 24, and highly efficient power generation using the heavy fuel oil can be realized.

Fifth Embodiment

Figure 9:
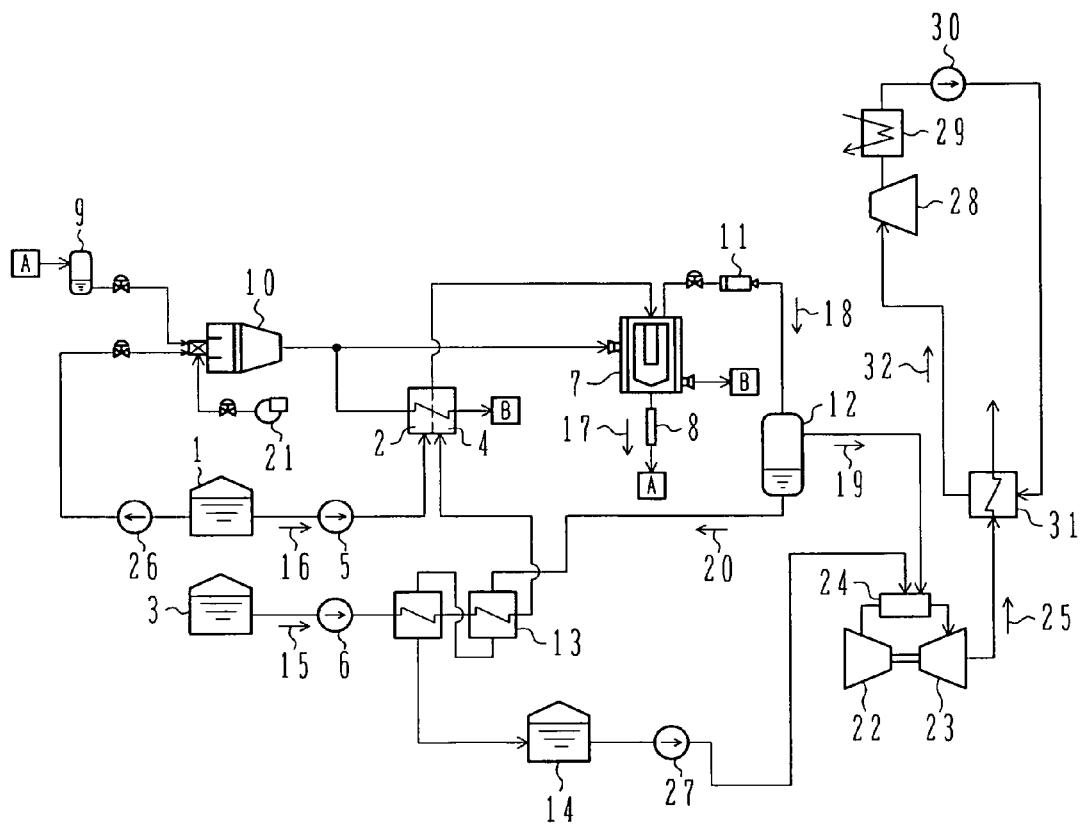
FIG. 9 is a diagram showing a fifth embodiment in which the gas-turbine power generating system shown in FIG. 8 is constituted in the combined form.

FIG. 9 shows a fifth embodiment in which water is used as the solvent and the gas-turbine generating system has a combined cycle. The following description is made of only a point differing from the fourth embodiment of FIG. 8. Because the gas turbine exhaust gas 25 still has high temperature of not lower than 500°C, it is supplied to the exhaust heat recovery boiler 31 to generate steam 32 that is utilized to drive a steam turbine 28. The steam 32 having been utilized to drive the steam turbine 28 is condensed to water by a condenser 29, and the condensed water is circulated to the exhaust heat recovery boiler 31 again by the pump 30. With the provision of such a combined cycle, power generation using the heavy fuel oil can be realized with higher efficiency.

Thus, according to the present invention, in the method for producing gas turbine fuel by removing the asphaltene component from heavy fuel oil with the use of the asphaltene-insoluble solvent, it is possible to selectively remove the asphaltene component and to increase the utilization factor of the heavy fuel oil usable as the gas turbine fuel. Hence highly efficient power generation using the heavy fuel oil can be realized.

What is claimed is:

1. A system for generating electric power by a gas turbine which is driven by using, as gas turbine fuel, components of heavy fuel oil obtained by bringing the heavy fuel oil into contact with an asphaltene-insoluble solvent and removing an asphaltene component, wherein said system includes an asphaltene removing unit for performing an asphaltene removing process in which the heavy fuel oil is brought into contact with an asphaltene-insoluble solvent having a specific inductive capacity in a range of 1.4 to 2.0.

2. The system for generating electric power by a gas turbine according to claim 1, wherein said solvent brought into contact with the heavy fuel oil in said asphaltene removing unit is water having a specific inductive capacity adjusted to be in the range of 1.4 to 2.0.

3. The system for generating electric power by a gas turbine according to claim 1, wherein the asphaltene component is separated in said asphaltene removing unit by utilizing a density difference and gravity.

4. The system for generating electric power by a gas turbine according to claim 2, wherein said system includes an asphaltene burning unit in which the asphaltene component separated from the heavy fuel oil by said asphaltene removing unit is burnt solely or with the aid of another fuel, high-temperature combustion gas generated by said asphaltene burning unit is employed as a heating source for adjusting the specific inductive capacity of the water, which is used as the solvent in said asphaltene removing unit, to be maintained in the range of 1.4 to 2.0, and heat generated by burning the asphaltene component is indirectly recovered by said gas turbine through the water serving as said solvent.

5. The system for generating electric power by a gas turbine according to claim 2, wherein exhaust gas discharged from said gas turbine is employed as at least one of a heating source for adjusting the specific inductive capacity of the water, which is used as the solvent in said asphaltene removing unit, to be maintained in the range of 1.4 to 2.0 and a heating source for performing the asphaltene removing process of a mixture of the heavy fuel oil and the water under temperature and pressure conditions at which the specific inductive capacity of the water is maintained in the range of 1.4 to 2.0, and heat of the exhaust gas discharged from said gas turbine is recovered by said gas turbine through the water serving as said solvent or through the heavy fuel oil.

6. The system for generating electric power by a gas turbine according to claim 2, wherein said system includes an exhaust heat recovery boiler for recovering heat of exhaust gas discharged from said gas turbine and for generating steam, the steam generated by said exhaust heat recovery boiler is employed as at least one of a heating source for adjusting the specific inductive capacity of the water, which is used as the solvent in said asphaltene removing unit, to be maintained in the range of 1.4 to 2.0 and a heating source for performing the asphaltene removing process of a mixture of the heavy fuel oil and the water under temperature and pressure conditions at which the specific inductive capacity of the water is maintained in the range of 1.4 to 2.0, and the heat of the exhaust gas discharged from said gas turbine is recovered by said gas turbine through the water serving as said solvent or through the heavy fuel oil.

7. The system for generating electric power by a gas turbine according to claim 1, wherein said system is a gas-turbine combined cycle system comprising an exhaust heat recovery boiler for recovering heat of exhaust gas discharged from said gas turbine and for generating steam, and a steam turbine driven by the steam generated by said exhaust heat recovery boiler.

\* \* \* \* \*